United States Patent [19]

Cho et al.

[11] Patent Number: 5,015,906
[45] Date of Patent: May 14, 1991

[54] ELECTROSTATIC LEVITATION CONTROL SYSTEM FOR MICROMECHANICAL DEVICES

[75] Inventors: Dong-Il D. Cho, Princeton Junction; Suresh Kumar, Princeton; William N. Carr, Wayne, all of N.J.

[73] Assignee: Princeton University, Princeton, N.J.

[21] Appl. No.: 431,385

[22] Filed: Nov. 3, 1989

[51] Int. Cl.⁵ .............................................. H02N 1/00
[52] U.S. Cl. .................................... 310/309; 310/90; 310/40 MM
[58] Field of Search .................. 310/90, 90.5, 40 MM, 310/309

[56] References Cited

U.S. PATENT DOCUMENTS

| | | | |
|---|---|---|---|
| 3,482,455 | 12/1969 | Boltinghouse et al. | 74/5.6 D |
| 3,847,026 | 11/1974 | Boltinghouse et al. | 764/5.6 D |
| 4,074,580 | 2/1978 | Boltinghouse et al. | 74/5.6 D |
| 4,521,854 | 6/1985 | Rhim et al. | 364/400 |
| 4,740,410 | 4/1988 | Muller et al. | 428/133 |
| 4,761,579 | 8/1988 | Delassus | 310/90.5 |
| 4,780,331 | 10/1988 | Cobbs, Jr. et al. | 427/25 |

OTHER PUBLICATIONS

Robert Gannon, "Micromachine Magic", *Popular Science*, Mar. 1989, pp. 88-92.

Primary Examiner—Steven L. Stephan
Assistant Examiner—Judson H. Jones
Attorney, Agent, or Firm—Mathews, Woodbridge & Collins

[57] ABSTRACT

A mass to be levitated is provided with an electrically conductive surface that is acted upon by an oscillating electrical force field generated by a plurality of charged conductive plates. The levitated mass is kept in static equilibrium in the electric field by driving the resonant circuit with an applied time varying voltage that has a frequency greater than the natural frequency of the resonant circuit. Motion of the mass is accomplished by providing actuator elements that are selectively charged to attract the mass in a given direction. Alternatively, the mass may be moved by employing a plurality of levitation control circuits that are sequentially energized.

22 Claims, 8 Drawing Sheets

ELECTROSTATIC LEVITATION CONTROL SYSTEM FOR MICROMECHANICAL DEVICES

BACKGROUND OF THE INVENTION

1. Field of the Invention

The present invention relates to micromachines and more particularly to devices for electrically levitating the moveable elements of a micromechanical structure.

2. Description of the Prior Art

In the field of microfabrication, it has been the general practice to employ many of the principles previously used in the microchip technology to microengineer tiny mechanical objects designed to act as machines. Such miniature machines often include a substrate made of a silicon wafer, or the like, on which are mounted moveable microstructures in the form of diaphragms, springs, sliders, cantilever beams, gears, levers, and driven motors. These elements often have dimensions in the order of one-tenth to one-thousand micrometers in any linear direction.

Although such micromachines have been successfully fabricated and tested, they have not proved entirely satisfactory under all conditions of service for the reason that considerable difficulty has been experienced in fabricating satisfactory bearings for those machine elements that have moving parts. The problem of friction and wear due to mechanical contact between stationary and moving parts in microdevices that produce motion is one of paramount concern because the performance and reliability of these miniature devices will depend critically on the amount of friction generated.

More specifically, U.S. Pat. No. 4,740,410 discloses a method that employs thin-film technology for making micromechanical elements having moveable parts which undergo rotational motion, rectilinear translation or a combination thereof. The patent suggests that micromechanical joints made in accordance with the disclosed method may be used to create such micromachines as optical reflectors or shutters, valves for fluids, ratchets, timing elements, analog computing elements, digital logic elements, accelerometers, engine-knock sensors, and force or torque transducers. The structures disclosed in U.S. Pat. No. 4,740,410 show frictional microjoints that have contacting surfaces of considerable size which can seriously effect the operation and sensitivity of the final device. Those concerned with the development of micromachines have recognized the need for reducing or eliminating the frictional wear created by microjoints of the type disclosed in this patent. For example, Gannon in "Micromachine Magic", *Popular Science,* March 1989, pp. 88-92 discusses the concern that workers in the field have expressed about friction in such micromachines. In this publication, Gannon quotes one such worker in the field as follows: "The friction issues are probably the most unknown, probably the most perplexing and potentially the most devastating".

Various methods have been proposed to reduce the shearing forces created by contact friction in such devices. These include the use of "bushings" that reduce the contact area and the use of edge-charged contacts that can provide additional sideward pull on the moving components to reduce the normal forces at the contacting surfaces. To date, most of the proposed designs still entail some mechanical contact between the moving and the stationary parts. Clearly, there is a critical need for the development of microstructures that can mitigate or even eliminate the problems associated with the friction encountered between moving parts in a micromachine.

The use of magnetic and electrostatic bearings to reduce or eliminate friction by levitating moveable machine components is well known. U.S. Pat. No. 4,761,579 describes levitation devices that can be used to levitate machine parts by the use of alternating currents passing through conducting wires that act as electro-magnets. These structures are inherently massive and, as such, are primarily meant to be used for supporting large objects. Electrostatic levitation systems are described in the following U.S. Pat. Nos.: 4,521,854; 3,482,455; 3,847,026; and 4,074,580. Again, these inventions are designed to be used in relatively large scale systems. In general, these levitation devices are complex and often require sophisticated feedback circuits that continuously monitor the position of a moving component to provide a feedback signal that modulates a voltage so as to maintain levitation. As a result, these inventions require the use of multiple components of substantial size that are not suitable for use in micromachines.

In U.S. Pat. No. 4,780,331 a method and an apparatus are described for electrostatically charging the minute particles of a fine powder so as to cause the powder particles to levitate and move toward a charged workpiece. In this invention, the powder particles move randomly toward the workpiece under the bias of an electrical field. The principles of this invention are not suitable for application to the fabrication of a micromachine wherein there are moving parts that must be stabilized at a fixed location or must move over a predefined path to perform some predefined function.

While the principles of levitation have been used with much success in reducing friction between moving parts of many machines, there has been no practical levitation system developed that can reasonably be applied to small scale structures such as micromachines. It is an object of the present invention to provide a levitation system for use with small scale structures.

SUMMARY OF THE INVENTION

The general purpose of this invention is to provide a device which can electrically levitate the moving masses of a miniature machine to eliminate all mechanical contact, while at the same time allowing the machine to produce the desired motion and force. To attain this, the device employs stabilizing circuits, consisting of an inductor in series with conducting plates formed on the machine, to act as a self-stabilizing resonant circuit. More specifically, in the present invention, the mass to be levitated is provided with an electrically conductive surface that is acted upon by an oscillating electrical force field generated by a plurality of charged conductive plates. The levitated mass is kept in static equilibrium in the electric field by driving the resonant circuit with an applied time varying voltage that has a frequency greater than the natural frequency of the resonant circuit. It is also contemplated in the present invention to provide a driving means for independently moving the levitated mass to produce a desired motion and force. The motion of the levitated mass may be used for a variety of purposes such as sensing an acceleration, acting as a shutter for a beam of light, or imparting a force to a workpiece.

Also, in accordance with the principles of the present invention, the levitation and motion control mechanisms may be separate structures that operate independently or a combined structure that can simultaneously coordinate both levitation and motion. The levitated structure may be driven to perform rotary or linear motion. In some of the embodiments, the moving mass has two-dimensional stability, while in other embodiments, means is provided for effecting three-dimensional spacial position levitation of the moving mass.

The exact nature of this invention as well as other objects and advantages thereof will be readily apparent from consideration of the following specification related to the annexed drawing.

DETAILED DESCRIPTION OF THE PREFERRED EMBODIMENT

Figure 1A:
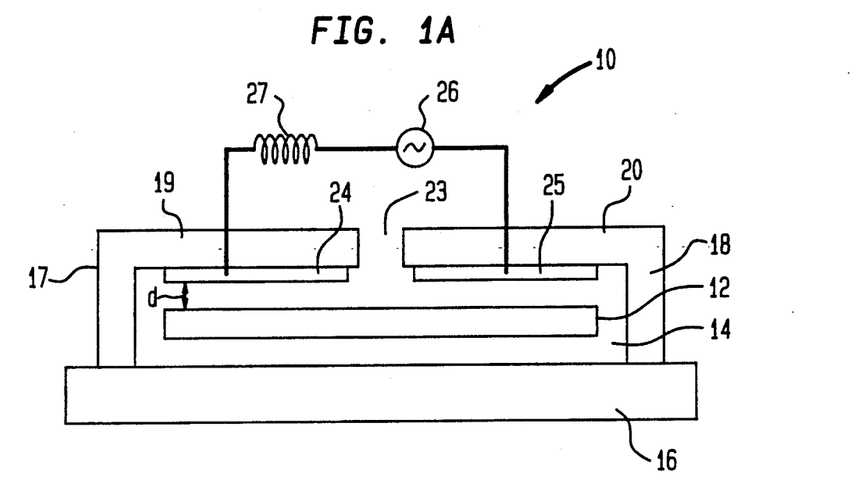
FIG. 1A is a schematic elevation of a preferred embodiment of the invention.
Figure 1B:
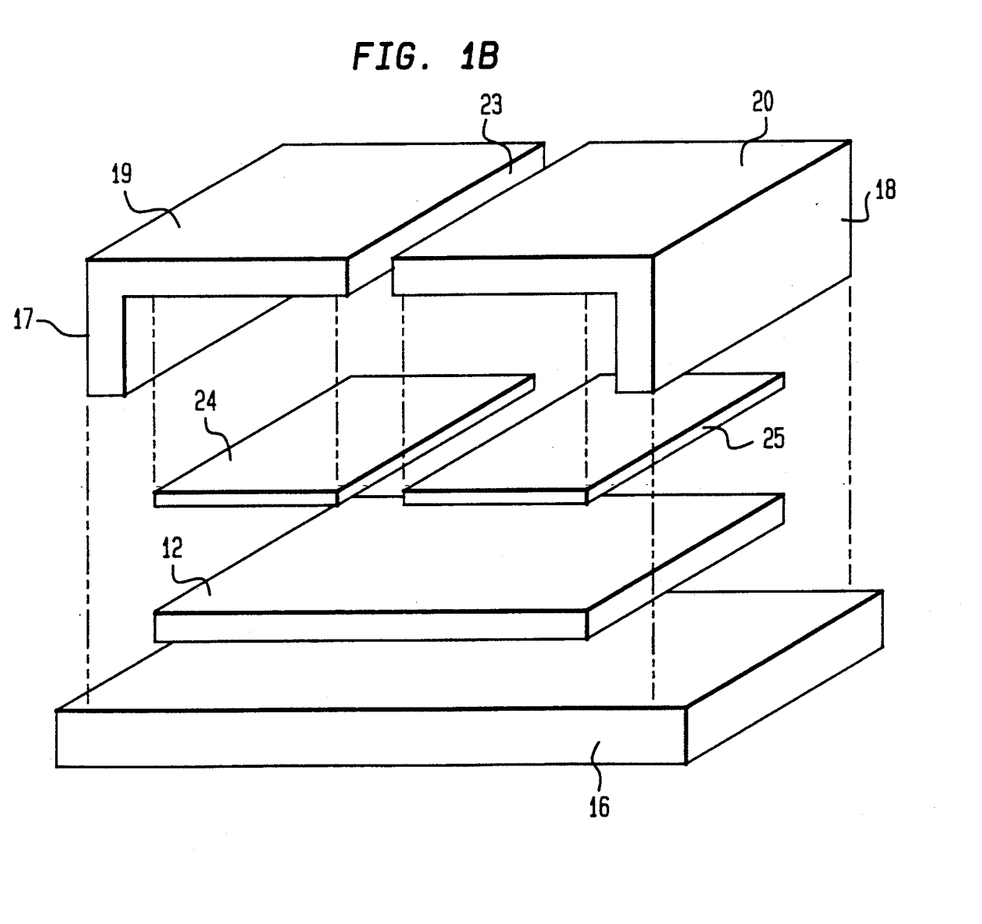
FIG. 1B is an exploded pictorial view of a portion of the device shown in FIG. 1A.
Figure 1C:
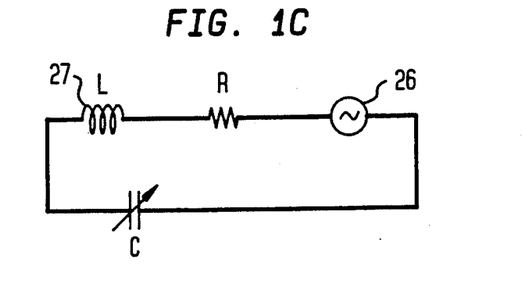
FIG. 1C is an equivalent circuit diagram for the device shown in FIG. 1A.

Referring now to the drawings, there is shown in FIG. 1A a micromechanical structure 10 having a moveable mass in the form of a thin, rigid plate 12 made of an electrically conductive material. The plate 12, having a generally rectangular shape, is free to move in a cavity 14 formed on the upper, flat surface of an electrically non-conductive substrate 16. The cavity 14 is defined by spaced vertical sidewalls 17, 18 that support upper walls 19, 20, respectively. The walls 19, 20 are coplanar and extend toward each other, leaving a narrow slit 23 therebetween. The walls 17-20 are made of an electrically non-conductive material. A pair of electrically conductive plates 24, 25 are mounted on the lower surface of walls 19, 20, respectively. The plates 24, 25 are symmetrically disposed on either side of slot 23 to generally outline an area equal to the size of plate 12. An electrical control circuit, composed of a high frequency voltage source 26 with a series-connected inductor 27, is connected across the plates 24, 25. As shown in the equivalent circuit of FIG. 1C, the combination of plates 12, 24, 25 define a variable capacitor C that forms a series LC resonant circuit with inductor 27. The resistor R in FIG. 1C represents the distributed resistance of the circuit. With the proper conditions, to be described below, the plate 12 will levitate in cavity 14; that is, plate 12 can be suspended in cavity 14 with no mechanical contact between the plate 12 and the walls 17-20 or the substrate 16.

In general, the plate 12, when levitating, is held in vertical equilibrium with a constant gap distance "d" (FIG. 1A). The vertical equilibrium position of the levitating plate 12 is maintained by using its own weight to offset the attractive electric force of the charged plates 24, 25. The plate 12 is held in stable equilibrium in the position shown in FIG. 1A by choosing a voltage having a frequency "$f_s$" for the source 26 that is greater than the natural frequency "$f_n$" of the resonant circuit (FIG. 1C) formed by the inductance L of inductor 27, the capacitance C of the conductive plates 12, 24, 25, and the distributed resistance R.

Although a vertical equilibrium position may be electrostatically achieved for the structure 10, i.e., with a constant voltage at source 26, that equilibrium would be unstable. For example, if the voltage source 26 produced a constant voltage such that the weight of plate 12, a downward force, is exactly offset by the electrostatic attraction between plate 12 and plates 24, 25, an upward force on plate 12, the plate 12 will be in equilibrium. However, a slight displacement of plate 12 upward from this equilibrium position will cause a change in the capacitance and, therefore, an increase in the attractive force exerted by the plates 24, 25, causing the plate 12 to collapse to the top. Similarly, a slight downward displacement of plate 12 from the equilibrium position will decrease the attractive force exerted by the plates 24, 25, causing plate 12 to fall to the substrate 16.

On the other hand, the plate 12 can be held in stable equilibrium, if the net force acting on the plate 12, when it is displaced from its equilibrium position is restoring, i.e., an upward displacement of plate 12 produces a net downward force and vice versa. This requires that the attractive force between the charged plates 24, 25 and the plate 12 be decreased as the gap distance "d" between them is decreased and increased as the gap distance "d" is increased.

A restoring force is achieved in the structure 10 by having the frequency "$f_s$" of the voltage source 26 greater than the natural frequency of the R, L, C resonant circuit. It is noted that when the plate 12 is perturbed from the equilibrium position, the capacitance value of the plates 12, 24, 25 changes, which in turn changes the voltage on plates 24, 25 and, therefore, the value of the electric force field in cavity 14 for a given value of the voltage produced by source 26. In the present invention, the frequency "$f_s$" is such that the rate of increase (or decrease) in the oscillating electric force field is greater than the rate of decrease (or increase) in the gap distance "d". As a result, the plate 12 will have a net vertical restoring force thereon that will be equal to zero at some levitation position located between the top surface of the substrate 16 and the undersurface of plates 24, 25. The net vertical restoring force will point downwardly when the gap distance "d"

decreases and will point upwardly when the gap distance "d" increases.

Additionally, a horizontal stable equilibrium position will also exist wherein the plate 12 is centrally positioned in cavity 14 just below the plates 24, 25. From this central position, a horizontal displacement of the plate 12, e.g. to the left or right, will produce a net horizontal restoring force on plate 12 in a direction opposite to the displacement. The net horizontal restoring force will exist regardless of the frequency of the charging voltage. For instance, if plate 12 is moved slightly to the right from the position shown in FIG. 1A, the attractive force produced by plates 24, 25 will have a net horizontal component to the left to pull the plate 12 back to the center. This horizontal component of the attractive force on plate 12 will be zero when the plate 12 is symmetrically disposed below the plates 24, 25 (the vertical component will remain equal to the weight of the plate 12).

Figure 2A:
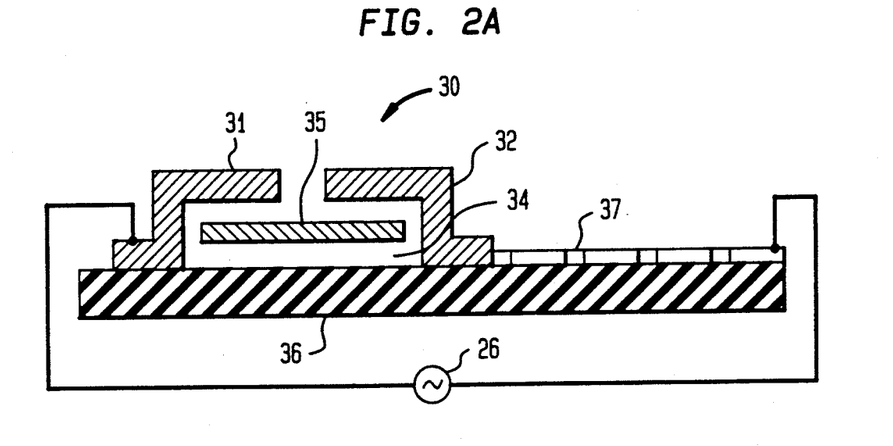
FIG. 2A is an elevation in cross-section, taken on the line 2A—2A of FIG. 2B looking in the direction of the arrows, of another embodiment of the invention.
Figure 2B:
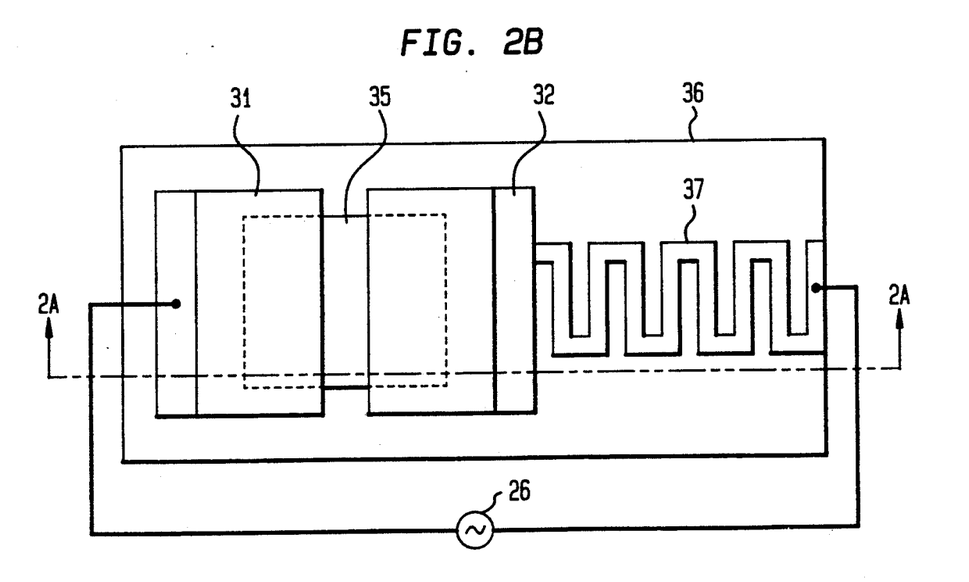
FIG. 2B is a top view of the device shown in FIG. 2A.

FIGS. 2A, 2B depict an alternate construction for the levitation device that, in some cases, may be simpler to fabricate. The structure 30 includes non-conductive substrate 36 with two Z-shaped conductive walls 31, 32 mounted thereon to form a levitation cavity 34 in which a metal plate 35 is levitated. The high frequency voltage source 26 is connected between wall 31 and one end of an inductor 37 that is mounted on the upper surface of substrate 36. Inductor 37 has its other end connected to plate 32. Inductor 37 may be etched from a thin film of conductive material into the zigzag configuration shown in FIG. 2B. The embodiment of FIGS. 2A, 2B operates on the same principle as that just described for the structure 10 of FIGS. 1A–1C. However, because the charged conductive walls 31, 32 surround three sides of the cavity 34, the electric force field in the cavity 34 will differ from that generated in cavity 14 of structure 10. In cavity 34 there will be an additional attraction between the charge on the vertical portions of walls 31 and 32 and the edges of the plate 35. This additional attraction, due to the oscillating electric field, can result in greater horizontal stability of the plate 35.

The levitation structures shown in FIGS. 1A–1C, 2A, 2B have two-dimensional stability, i.e., structures 10, 30 will not levitate when positioned upside down. Three-dimensional stability, i.e. levitation for all spacial orientations, is possible with the embodiment of FIG. 3 which, in effect, consists of two of the previously described devices mounted back-to-back.

Levitation structure 40 (FIG. 3) includes a non-conductive substrate 46 on which is mounted two vertical walls 47, 48 which support horizontal walls 49, 50, respectively, to form a cavity 44 with a narrow slit 53. Mounted on the undersurface of walls 49, 50 are conductive plates 54, 55, respectively. Similar conductive plates 51, 52 are mounted on the upper surface of substrate 46 inside the cavity 44 and directly below the plates 54, 55, respectively. A levitating mass 42, placed in cavity 44, includes a thin, non-conductive plate 43 sandwiched between conductive plates 41, 45. The high frequency voltage source 26 is connected on one side to superimposed plates 52, 55. A pair of inductors 57, 58 are each connected between the other side of source 26 and the superimposed conductive plates 54, 51, respectively.

The mass 42 of structure 40 will levitate in stable equilibrium for all spacial orientations of the structure 40. While the structures 10, 30 depend on using an electrical force field to counterbalance the force of gravity on the moving masses (plates 12, 35), the structure 40 is substantially independent of gravity. The structure 40, having two-fold symmetry about a horizontal axis, looks electrically the same either right side up or upside down. As a result, it operates substantially the same in both the FIG. 3 position and in a position inverted with respect to FIG. 3. The plates 51, 52, 54, 55, when charged by source 26, will all attract the mass 42. In order to achieve equilibrium in the FIG. 3 position, plates 54, 55 must overcome two downwardly directed forces on mass 42, the downwardly directed attractive force on mass 42 due to charged plates 51, 52 and the weight of mass 42. When in the inverted position, the plates 51, 52, now positioned on top, must overcome the downwardly directed attractive force on mass 42 due to charged plates 51, 52 plus the weight of mass 42. Any slight perturbation in the vertical direction from either equilibrium position will cause the composite capacitance of plates 41, 45, 51, 52, 54, 55 to change. For example, if mass 42 is displaced upwardly, thereby decreasing gap distance "d", the composite capacitance will change with a corresponding change in the electric force field in cavity 44. As in the earlier-described embodiments, the slight displacement of mass 42 will produce a net restoring force in the direction opposite to the displacement because the source frequency "$f_s$" is such that the rate of change of the voltage on plates 51, 52, 54, 55 is greater than the rate of change of the gap distance "d".

Figure 3:
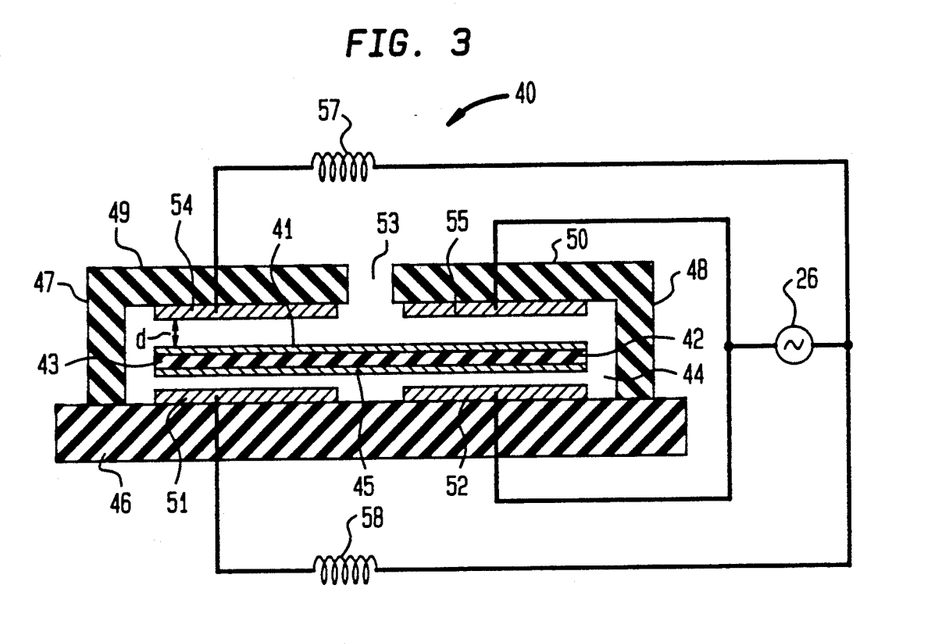
FIG. 3 is an elevation in cross-section, similar to the view shown in FIG. 1A, of still another embodiment of the invention.

The structure 40 will also operate when positioned on its side, provided the applied voltage is sufficiently large i.e., with the mass 42 in a vertical plane. In that position, the charged plates 51, 52, 54, 55 will, as before, attract the mass 42 to maintain stable equilibrium, this time in the horizontal direction. The mass 42 will be attracted horizontally by plates 54, 55 an amount that is equal and opposite to the horizontal attraction of plates 51, 52. These equal and opposite electrical attractions will keep the mass 42 centered horizontally. The attractive force on mass 42 due to charged plates 51, 52, 54, 55 will also have a net vertical component. This vertical component will be an upwardly directed force on mass 42 that will be equal to the weight of mass 42, thereby establishing levitation in a vertical position.

The structures 10, 30, 40 have moveable masses (plate 12, plate 35, mass 42) which may be used to perform useful work while moving in the frictionless environment made possible by the levitation structure. Those skilled in these arts will readily perceive of a variety of uses for these simple machines. For example, the structures 10, 30, 40 could be employed as variable capacitance accelerometers. When there is zero acceleration of an object on which the levitation structure is placed, the moveable mass will levitate in its equilibrium position. However, when the object accelerates, the levitation structure will also accelerate causing the moveable mass to be forced from the equilibrium position and, therefore, causing the capacitance of the resonant circuit to change. This change in capacitance will cause an amplitude and frequency change in the currents in the inductors 27, 37, 57, 58 that may be readily detected by conventional methods. The detected current changes will, of course, be a measure of the acceleration of the object.

Figure 4A:
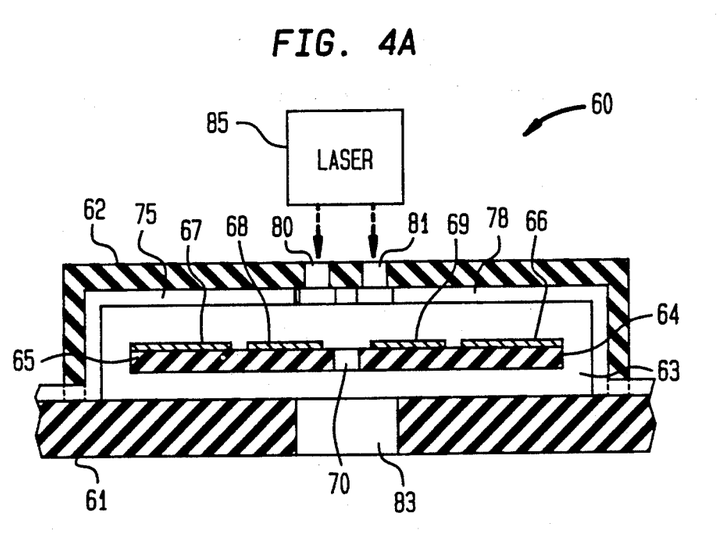
FIG. 4A is an elevation in cross-section, taken along the line 4A—4A of FIG. 4C looking in the direction of the arrows, of yet another embodiment of the invention.
Figure 4B:
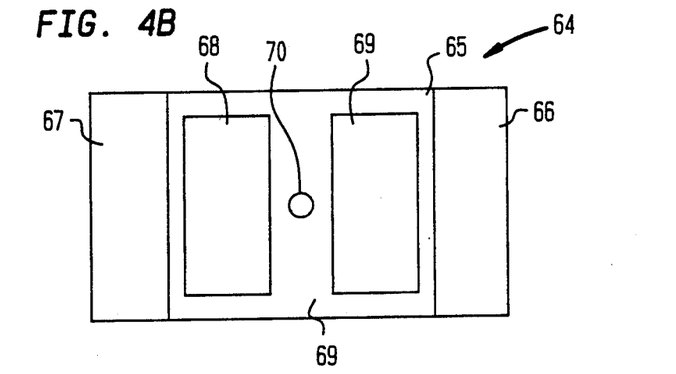
FIGS. 4B and 4C are top views of portions of the apparatus shown in FIG. 4A.
Figure 4C:
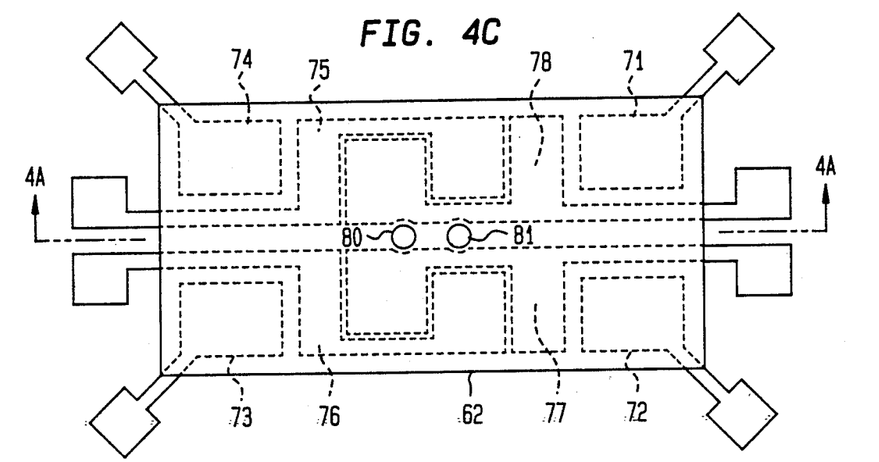

FIGS. 4A–4D, 5A–5C, 6A–6C show various embodiments of levitation structures that include specific actuator means for causing particular motions of the levitating masses. In FIGS. 4A–4D, an optical shutter 60 is illustrated. The shutter 60 includes a non-conductive substrate 61 having a non-conductive housing 62 mounted thereon to form a levitation cavity 63. A slider 64, including a non-conductive plate 65, is located in cavity 63. A hole 70 is located at the center of slider 64. As seen in FIG. 4B, two levitation plates 66, 67 of electrically conductive material are mounted at either end of the upper surface of plate 65. A pair of actuator plates 68, 69 are symmetrically fixed on either side of hole 70 between plates 66, 67.

The inside surface of the housing 62 and the upper surface of substrate 61 have four conductors forming levitation plates 71, 72, 73, 74. Plates 71-74, generally located at the four corners of the housing 62, have working surfaces that are superimposed above the levitation plates 66, 67 on slider 64. Mounted on the same surface with plates 71-74 are four conductors forming stator plates 75, 76, 77, 78. The working areas of plates 75-78 are generally U-shaped. Plates 75, 78 are interdigitated with each other and lie on one side of housing 62 between the working areas of plates 71, 74. Plates 76, 77 are mounted on the other side of housing 62 and together with plates 72, 73 form a mirror image of the plates 71, 74, 75, 78. Plates 75, 76 each extend over an area that has a center that lies to one side (the left side in FIG. 4C) of the center of the housing 62. Plates 77, 78 each extend over an area that has a center that lies to the other side of housing 62 (the right side in FIG. 4C). Conductive extensions on plates 71-78 extend along substrate 61 to the outside of housing 62 to form connector pads for connecting electric circuits thereto. A pair of holes 80, 81 are located in the upper wall of housing 62 between plates 77, 78 and on either side of the center of housing 62. A dual-beam optical source having a laser 85 is mounted above housing 62 to direct parallel laser beams through holes 80, 81. An opening 83 is located at the center of substrate 61 just below holes 70, 80, 81.

Figure 4D:
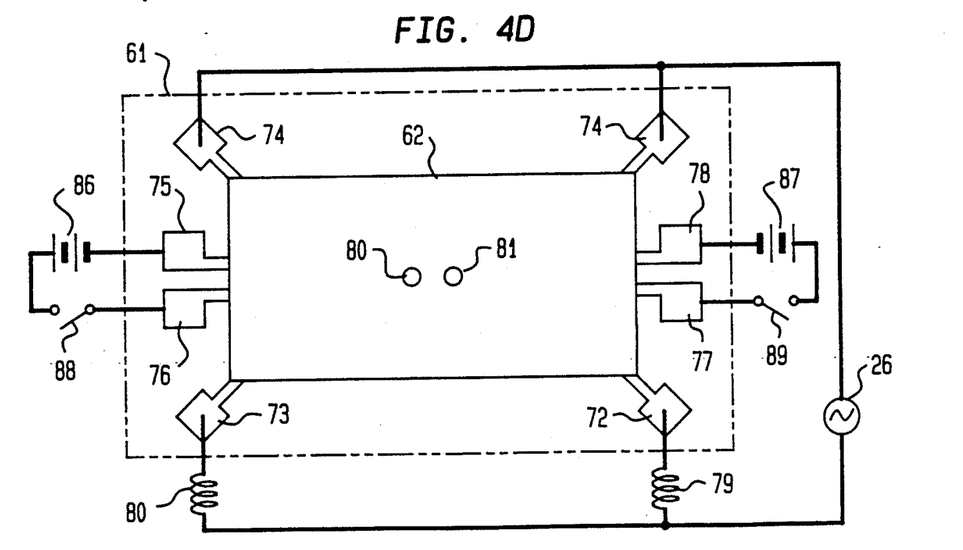
FIG. 4D is a top view of the device shown in FIG. 4A.

As seen in FIG. 4D, a high frequency voltage source 26 is connected between one side of the inductors 79, 80 and the plates 71, 74. Plates 72, 73 are connected to the other side of inductors 79, 80, respectively.

Shutter 60 achieves two-dimensional levitation via the charged plates 71-74. Plates 71, 72 will provide sufficient force to attract upwardly at least one half of slider 64 while plates 73, 74 provide sufficient force to attract upwardly at least the other half of slider 64. Together, the plates 71-74 will provide sufficient attraction of slider 64 to establish levitation.

A DC voltage source 86 is connected across plates 75, 76 via a switch 88. A second DC voltage source 87 is connected across plates 77, 78 via a switch 89. While levitating, the slider 64 may be attracted horizontally to either the left or right (FIG. 4A) with the use of the switchable DC voltage sources 86, 87. When both switches 88, 89 are open, the slider 64 will levitate in the center of cavity 63 such that neither of the laser beams pass through hole 70. With only switch 88 closed, the plates 75, 76 will be charged sufficiently by source 86 to attract the slider 64 to the left (FIG. 4A) via plates 68, 69. As a result, holes 70, 80 will be aligned permitting one of the laser beams to pass through hole 70 and opening 83 to a utilization device (not shown). With switch 88 open and switch 89 closed, the slider 64 is biased to the right due to the attraction of plates 68, 69 by charged plates 77, 78. As such, hole 70 moves into alignment with hole 81 permitting the other laser beam to pass through hole 70 and opening 83 to a utilization device. The shutter 60 may be used for a variety of purposes many of which will become evident to those skilled in these arts. One excellent application for the shutter 60 would be as a digital light chopper in an optical logic device. Digital electronic signals may be used to open and close switches 88, 89 to produce digital chopping of the laser light beams.

The shutter 60 is one example of a typical micromachine that produces rectilinear motion. In shutter 60 the mechanism that controls levitation (plates 66, 67, 71-74, source 26, inductors 79, 80) is distinct from the mechanism that produces the back-and-forth horizontal motion of slider 64 (plates 75-78, DC voltage sources 86, 87 and switches 88, 89). These mechanisms may be combined such that levitation and motion are controlled and caused by the same mechanism. Examples of such systems are shown in FIGS. 5A-6C. The levitating masses may also be made to undergo rotational motion as shown in FIGS. 6A-6C.

Figure 5A:
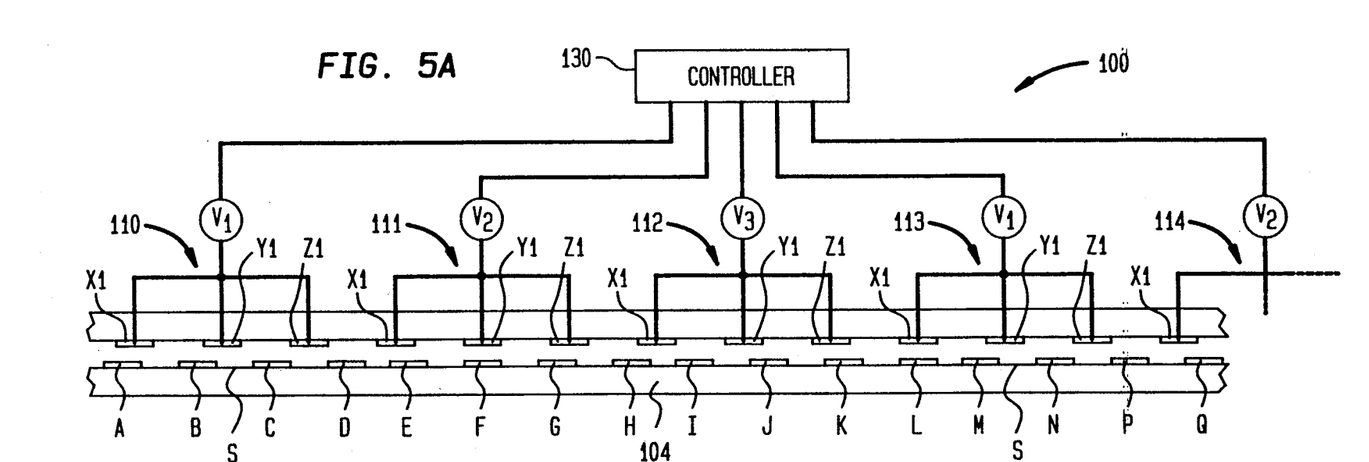
FIG. 5A is a schematic elevation of a portion of a further embodiment of the invention.
Figure 5B:
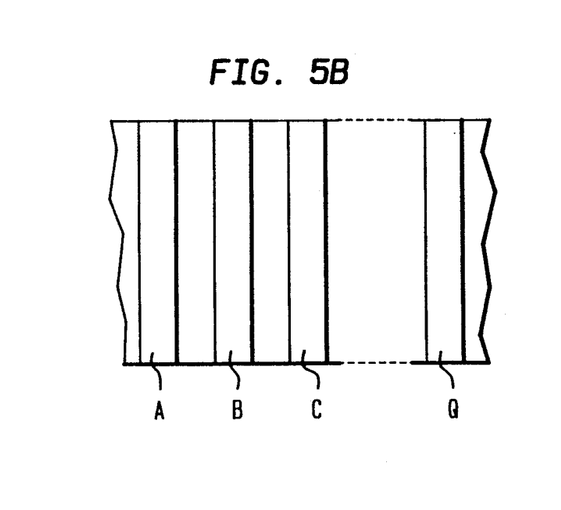
FIG. 5B is a top view of a portion of the device shown in FIG. 5A.
Figure 5C:
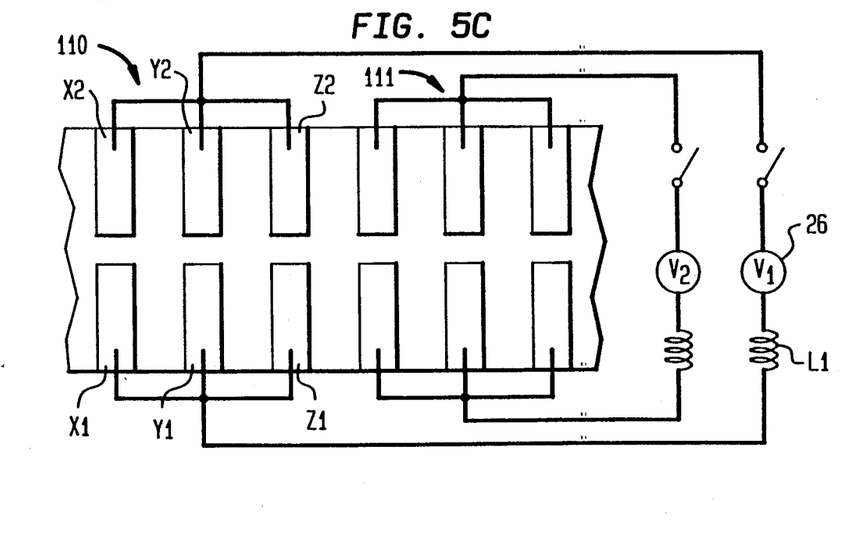
FIG. 5C is a bottom view of a portion of the device shown in FIG. 5A.
Figure 6A:
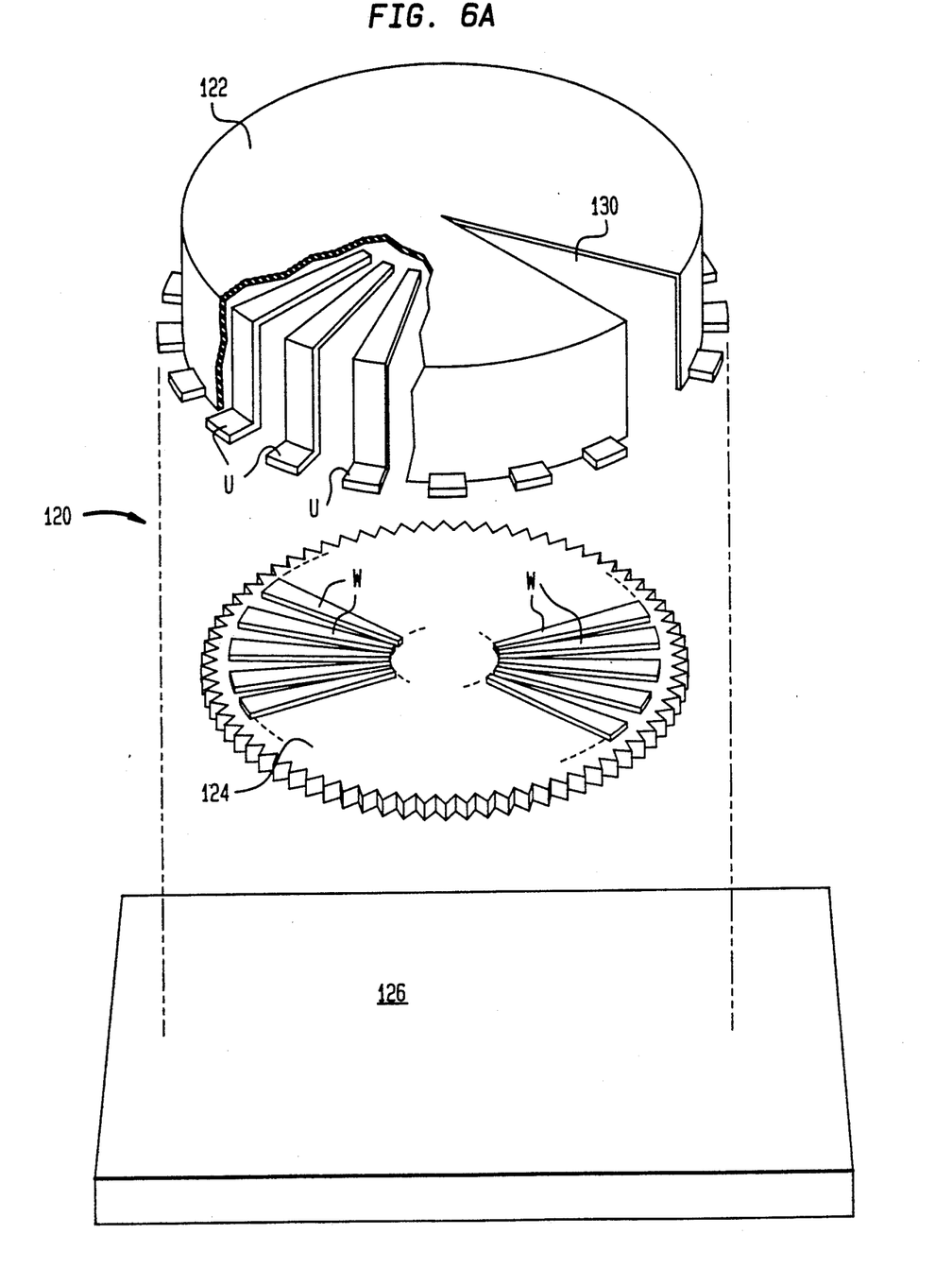
FIG. 6A is an exploded pictorial view with parts broken away of yet a further embodiment of the invention.
Figure 6B:
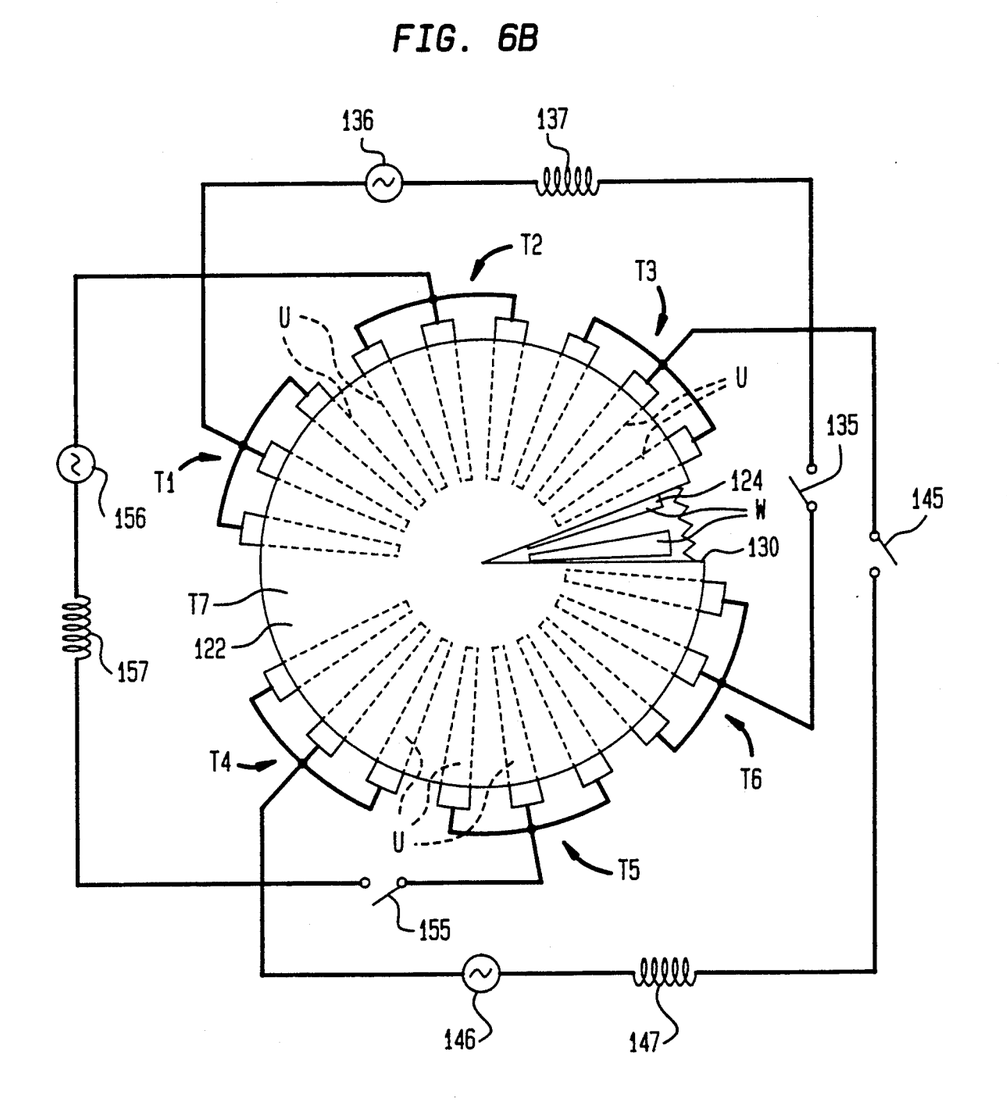
FIG. 6B is a top view of a portion of the device shown in FIG. 6A with a schematic electrical diagram incorporated therein.
Figure 6C:
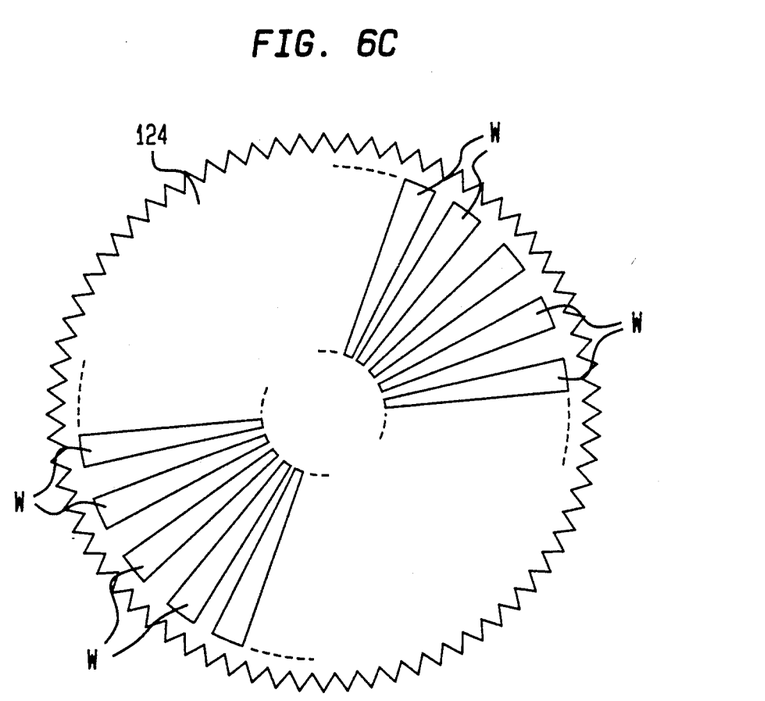

The machine in FIGS. 5A-5C is designed to produce rectilinear motion that may be precisely controlled with respect to speed, direction and location of the mass. The levitation structure 100 includes a stator 102 and a slider 104. Slider 104 has a non-conductive substrate 106 on which are formed a plurality of conductive plates A-Q. The stator 102 has a plurality of conductive plates that are grouped into a plurality of sectors 110, 111, 112, 113, 114. Each sector 110-114 has six plates X1, Y1, Z1, X2, Y2, Z2 mounted on opposite sides of stator 102. As indicated in FIG. 5A, every third sector is connected to a common high frequency voltage source V1-V3. For example, sectors 110 and 113 are each connected to high frequency voltage source V1. As such, the structure 100 is connected to operate as a three-phase actuator. As those skilled in these arts will now recognize, the structure 100 may be connected to operate in other n-phase modes. Only a portion of the structure 100 is illustrated. The dashed lines indicate that the length of structure 100 is arbitrary and that the configuration is repetitive. Sectors 110, 113 have the high frequency voltage source V1 connected between plates X1, Y1, Z1 and an inductor L1, which in turn is connected to plates X2, Y2, Z2. Sector 111 is shown in FIG. 5C as having a voltage source V2 connected to plates X1, Y1, Z1 and to an inductor L2. Plates X2, Y2, Z2 of sector 111 are connected to the inductor L2. The high frequency voltage sources V1-V3 are gated "ON" and "OFF" by a controller 130.

It is noted that the spacing between plates X1-Z2 is different from the spacing between the slider plates A-Q. This difference in spacing is used to help produce linear, horizontal motion. Levitation of slider 104 is achieved by the electrical, high frequency attractive forces on plates A-Q by the plates X1-Z2 in the same manner as described earlier for the other embodiments. With the structure 100 positioned as shown in FIG. 5A, the slider 104 can also be made to slide to the left by sequentially energizing the voltages V1, V2, V3, V1, V2, etc. For example, when the voltage V1 is energized, the charges on plates X1-Z2 in sectors 110, 113 will attract slider plates A-D and L-P, respectively. As described earlier, this vertical attraction can be used to effect levitation. However, because the plates A-Q on the slider 104 are not symmetrically arranged with respect to the plates X1-Z2 on stator 102 there will also be a horizontal attraction of plates A-Q that will cause the slider 104 to move horizontally until the center of the charge distribution on the plates X1-Z2 and A-Q are symmetric with respect to each other. More specifically, when voltage V1 is energized, the slider 104 will be attracted to the left (FIG. 5A) until the points "S" are positioned directly below the center of plates Y1. At that position, the slider plates A-D and L-P will be symmetrically disposed below the charged plates X1-Z2 of sectors 110, 113, respectively. If, at the instant that points "S" move to the equilibrium position precisely below plates Y1, the voltage V1 is deenergized and the voltage V2 is energized by controller 130 then the slider 104 will be forced further to the left since at this instant there will be an asymmetrical plate alignment for the sectors 111 and 114 and plates E-H, the four closest slider plates to sector 111, and plates Q, etc. Again, this misalignment will cause a left horizontal force component on the slider 104. This actuating process may be continued by energizing V3 and deenergizing V2 at the precise moment that there is an alignment of the plates below sectors 111 and 114. At this point the cycle may be repeated for further motion of slider 104.

The plate spacings shown in FIG. 5A are merely representative and other arrangements will become evident to those skilled in these arts. The relative dimensions illustrated in FIG. 5A are approximately as follows: the plates X1-Z2 and A-Q are all six units wide; the longitudinal spacing between plates X1-Z1 and X2-Z2 is eight units; the longitudinal spacing between adjacent plates A-D, E-H, I-L, etc. is six units; and the longitudinal spacing between plates D and E, and H and I, and L and M is four units.

The structure 100 is of special importance because it demonstrates the inventive concepts wherein the levitation mechanism and the actuation mechanism are combined into a common mechanism. The three-phase actuator of FIGS. 5A-5C can be operated at a wide range of speeds and can be energized in a number of modes to vary the speed as desired by simply energizing the high frequency voltage sources V1-V3 in some desired sequence.

FIGS. 6A-6C illustrate a three-phase actuator wherein rotary motion is imparted to a disk-shaped levitating rotor 124. The rotor 124 has a serrated edge to form a miniature saw 120. The levitating saw 120 includes a drum-shaped housing 122 mounted on a non-conductive substrate 126. The housing 122 has a pie-shaped opening 130. The remaining portion of the housing 122 is divided into sectors T1-T7. Sectors T1-T6 each have three pie-shaped radial strips U of conductive material. The strips U in sector T1 and the diametrically opposed sector T6 are connected to a series circuit having a switch 135, an inductor 137 and the high frequency voltage source 136. In a similar manner, the strips U in sectors T3, T4 are connected to resonant circuits having voltage source 146, inductor 147 and switch 141. Voltage source 156, inductor 157 and switch 155 are connected in series between the strips U in sectors T2, T5. The frequencies of voltage sources 136, 146, 156 are chosen, in accordance with the principles of this invention, to be greater than the natural frequencies of the resonant circuits connected thereto, so as to cause the rotor 124 to levitate by attracting the conductive strips W thereon. The strips W are arranged radially about the rotor 124 with an asymmetrical spacing with respect to the strips U. This asymmetry may be similar to the asymmetrical spacing of plates A-Q in FIG. 5A. The spacing of strips U is such that two groups of adjacent strips W, on opposite sides of the rotor 124, will be attracted by the strips U in opposed sectors T1-T6 to effect levitation. Also, because the two groups of attracted strips W will not, in general, be symmetrically disposed with respect to the charged strips U, there will be horizontal components of the attracting forces in the plane of rotor 124. These components will define parallel forces of opposite sense to form a couple that will impart a torque and, therefore, a rotation to rotor 124 about its center. The torque will become zero when the charge distribution on the strips W are symmetrically disposed with respect to the charge distribution on the six charged strips U on housing 122. At this point, the charge on the attracting strips U is removed, by opening its corresponding switch, and the plates U in another pair of sectors are charged. Of course, the switches 135, 145, 155 may be actuated sequentially to produce a smooth continuous rotation or in some other desirable mode to produce some type of oscillatory rotation. Also, the speed and forces on rotor 124 may be controlled by properly sequencing switches 135, 145, 155.

The serrated edge on rotor 124 may be used to abrade a delicate surface or reflect a light beam. In the medical field, for example, the saw 120 may be used to abrade scar tissue on a delicate body part, such as the retina, or to remove unwanted material in the veins or other sensitive areas. When used as a light beam reflector, the serrated edge may reflect pulses of light in an optical system.

Obviously many modifications and variations of the present invention are possible in the light of the above teachings. For example, moving parts in all embodiments may be made to levitate with three-dimensional stability by providing additional charged plates in the manner described with respect to the embodiment of FIGS. 4A-4D. It is therefore to be understood, that within the scope of the appended claims, the invention may be practiced otherwise than as specifically described.

What is claimed is:

1. A levitation structure comprising:
   a support made of an electrically non-conductive material;
   first and second spaced electrical conductors mounted on said support;
   a mass having a third electrical conductor mounted thereon freely positioned adjacent said first and second electrical conductors;
   circuit means connected to said first and second electrical conductors for forming a resonant circuit including said first, second and third conductors and having a natural frequency; and
   a voltage means for driving said circuit means with an oscillating voltage having a frequency greater than said natural frequency.

2. The structure of claim 1 wherein said first, second and third conductors have variable capacitance and said circuit means includes an inductance means in series with said variable capacitance.

3. The structure of claim 2 wherein said inductance means includes a coil.

4. The structure of claim 1 wherein said first, second and third conductors include conductive plates.

5. The structure of claim 1 wherein said first and second conductors include conductive plates that lie in a common plane.

6. The structure of claim 5 wherein said third conductor includes a conductive plate that is spaced below said common plane.

7. The structure of claim 1 wherein said mass is shaped as a flat plate.

8. The structure of claim 1 wherein said mass includes a non-conductive material having a flat surface thereon and said third conductor is a sheet of conductive material fixed on said flat surface.

9. The structure of claim 8 wherein said first and second conductors include conductive plates that lie in a common plane spaced above said flat surface.

10. The structure of claim 1 further including fourth and fifth spaced electrical conductors mounted on said support adjacent said third conductor with said third conductor having said first and second conductors on one side and said fourth and fifth conductors on the opposite side thereof and wherein said circuit means is connected to said fourth and fifth conductors.

11. The structure of claim 10 wherein said first and second conductors include conductive plates that lie in a first plane, said fourth and fifth conductors include conductive plates that lie in a second plane, and said mass is shaped as a flat plate mounted between said first and second planes.

12. A levitation structure comprising:
a support made of an electrically non-conductive material;
first and second spaced electrical conductors mounted in a first plane on said support;
a mass having a sheet of non-conductive material;
third and fourth electrical conductors mounted on opposite sides of said sheet;
fifth and sixth spaced electrical conductors mounted in a second plane on said support wherein said first and second planes are substantially parallel;
said mass mounted between said first and second planes and said first, second and third conductors forming a first capacitance means and said fourth, fifth and sixth conductors forming a second capacitance means;
first inductance means connected in series with said first capacitance means to form a first resonant circuit having a first natural frequency;
second inductance means connected in a series with said second capacitance means to form a second resonant circuit having a second natural frequency; and
voltage means for driving said resonant circuits with an oscillating voltage having a frequency greater than said natural frequencies.

13. A levitation structure comprising:
a support made of an electrically non-conductive material;
a plurality of electrical conductors mounted on said support;
a mass having an electrical conductor means mounted thereon positioned adjacent said support;
circuit means connected to said plurality of conductors on said support for forming a resonant circuit with the conductor on said mass and having a natural frequency;
a voltage means for driving said circuit means with an oscillating voltage having a frequency greater than said natural frequency for causing said plurality of conductors on said support to attract the conductor means on said mass to levitate said mass in an equilibrium position; and
motion means for selectively moving said mass with respect to said support.

14. The structure of claim 13 wherein said motion means includes a stator conductor for selectively attracting said conductor means on said mass to move said mass with respect to said support.

15. The structure of claim 14 wherein said motion means moves said mass linearly out of said equilibrium position.

16. The structure of claim 14 wherein said motion means rotates said mass.

17. The structure of claim 13 wherein said motion means includes means for selectively driving said circuit means with said driving means for causing different groups of said conductors on said support to sequentially attract the conductor on said mass to simultaneous levitate and move said mass.

18. The structure of claim 17 wherein said conductor means on said support includes a plurality of spaced conductors.

19. The structure of claim 17 wherein said mass is an elongated sheet of non-conductive material and said conductor means includes a plurality of parallel strips of conductive material spaced thereon.

20. The structure of claim 17 wherein said mass is a circular disk and said conductor means includes radial strips of conductive material mounted on said disks.

21. The structure of claim 20 wherein said circular disk includes a serrated edge.

22. The structure of claim 13 further including a light source means for directing a light beam towards said mass and wherein said mass includes means for chopping said light beam as said mass moves with respect to said support.

* * * * *